United States Patent
Xu (10) Patent No.: US 10,884,135 B2
(45) Date of Patent: Jan. 5, 2021

(54) METHODS, DEVICES AND RECEIVERS FOR SATELLITE SIGNAL ACQUISITION

(71) Applicant: ComNav Technology Ltd., Shanghai (CN)

(72) Inventor: Min Xu, Shanghai (CN)

(73) Assignee: ComNav Technology Ltd., Shanghai (CN)

(*) Notice: Subject to any disclaimer, the term of this patent is extended or adjusted under 35 U.S.C. 154(b) by 253 days.

(21) Appl. No.: 16/210,915

(22) Filed: Dec. 5, 2018

(65) Prior Publication Data

US 2019/0219707 A1    Jul. 18, 2019

(30) Foreign Application Priority Data

Dec. 6, 2017 (CN) .......................... 2017 1 1276797

(51) Int. Cl.
*G01S 19/24* (2010.01)
*G01S 19/27* (2010.01)

(52) U.S. Cl.
CPC ............ *G01S 19/246* (2013.01); *G01S 19/27* (2013.01)

(58) Field of Classification Search
CPC ........ G01S 19/24; G01S 19/246; G01S 19/27; G01S 19/30; G01S 19/29; G01S 19/34; G01S 19/37

USPC ...................................................... 342/357.63
See application file for complete search history.

(56) References Cited

U.S. PATENT DOCUMENTS

| | | | |
|---|---|---|---|
| 2007/0205940 A1* | 9/2007 | Yang ....................... | G01S 19/29 342/357.59 |
| 2008/0240309 A1* | 10/2008 | Jia .......................... | G01S 19/235 375/344 |
| 2014/0112103 A1* | 4/2014 | Goldman .............. | G01S 3/8006 367/118 |

* cited by examiner

*Primary Examiner* — Harry K Liu
(74) *Attorney, Agent, or Firm* — Marshall, Gerstein & Borun LLP (57) ABSTRACT

The present invention relates to a method for acquiring satellite signals. The method utilizes the predictability of the first two words of each sub-frame of the navigation message, by controlling the acquisition time of the intermediate frequency data and the PN code, acquiring corresponding intermediate frequency data and PN code from the acquisition time, processing the intermediate frequency data and the PN code to determine whether the satellite signal is acquired, during the acquisition processing and determination process, the navigation message peeling operation is performed using the predictability of the first two words of each sub-frame of the satellite navigation message and PN code, in this way, extending the time of coherent integration is achieved, and thereby improves the acquisition sensitivity.

20 Claims, 6 Drawing Sheets

METHODS, DEVICES AND RECEIVERS FOR SATELLITE SIGNAL ACQUISITION

CROSS-REFERENCE TO RELATED APPLICATIONS

The application claims priority to the Chinese patent application No. 201711276797.8, filed on Dec. 6, 2017, the entire disclosure of which is incorporated herein by reference as part of the present application.

TECHNICAL FIELD

The present application relates to the field of satellite signal processing, and in particular relates to the field of satellite signal acquisition and tracking.

BACKGROUND

Nowadays, with the development of navigation technology, GNSS devices are popular and widely used. However, there is at least a problem of low signal acquisition sensitivity that needs to be solved in GNSS devices.

SUMMARY

Therefore, the technical solution proposed by the present application is described in detail below.

In one aspect, the present application provides a method for acquiring a satellite signal, the method comprising: an operation of estimating a satellite signal transmitting time, comprising: acquiring a receiver time, estimating an error of the receiver time to generate an estimated value of receiver time; obtaining an estimated value of the satellite signal travel time, and determining an estimated value and an error range of the satellite signal transmitting time according to the estimated value of the receiver time and the estimated value of the satellite signal travel time.

In another aspect, the present application provides a board device, which comprises a signal acquisition device, the signal acquisition device including: a satellite signal transmitting time estimation module, performing a satellite signal travel time estimation operation: acquiring a receiver time, estimating an error of a receiver time to generate an estimated value of receiver time, obtaining an estimated value of the satellite signal travel time, and determining an estimated value of the satellite signal transmitting time according to the estimated value of the receiver time and the estimated value of the satellite signal travel time.

In a further aspect, the present application provides a receiver comprising the board device described above.

From the detailed description below, other aspects and embodiments of the present invention will be apparent, with reference to the drawings, the principles of the present invention are illustrated by way of example.

BRIEF DESCRIPTION OF THE DRAWINGS

With reference to the following figures, non-limiting and non-exhaustive embodiments of the present disclosure are described. Unless otherwise indicated, the same reference numerals will be used throughout the drawings. The components in the figures are not drawn to scale and may be drawn out of proportion to facilitate the understanding of the embodiments of the present disclosure.

In the following detailed description, references are made to the drawings that form part of the description, and the drawings are illustrated in a way to illustrate particular exemplary embodiments in which the disclosure is disclosed. The embodiments are described in sufficient detail to enable those skilled in the art to be able to practice the inventions disclosed herein. And it is to be understood that modifications may be made to the various disclosed embodiments and other embodiments may be employed without departing from the scope of the disclosure. Therefore, the following detailed description is not to be considered as to limit.

DETAILED DESCRIPTION

The following description is presented to illustrate the general principles of the invention and is not intended to limit the inventive concepts claimed. Moreover, the particular features described herein can be used in combination with other described features in each of the various possible combinations and permutations.

Unless otherwise specifically defined herein, all terms are to be given the broadest interpretation, including the meaning implied by the present specification, and meanings understood by those skilled in the art and/or as defined in lexicon, papers, and the like.

The following description discloses several preferred embodiments of methods and device for acquiring satellite signals, and their operations and/or components.

In the process of tracking GNSS satellite signals, in order to enable the receiver to successfully track and lock the signal of a satellite after start-up, the receiver needs to estimate two parameter values, the carrier frequency and code phase of the satellite signal, through the preliminary acquisition process. And the error of the estimated values of these signal parameters must be smaller than the pull-in range of the carrier loop and the code loop respectively, then the receiver initializes the tracking loop according to the values of these signal parameters, so that the tracking loop can pull in the reception until it successfully enters the normal tracking state. In the preliminary satellite signal acquisition process, according to different ways of realizing correlation calculation, the signal search-acquisition algorithm can be divided into linear search, parallel frequency search, parallel code phase search, etc.

The linear search performs a two-dimensional scanning search in two dimensions on the carrier frequency and the code phase of the satellite signal, the acquisition unit implements coherent integration and non-coherent integration of the satellite signals, and performs an acquisition determination based on the obtained integration result and the acquisition threshold to complete the final acquisition, wherein, the selection of the acquisition threshold depends on the time selected by the acquisition algorithm for coherent integration and non-coherent integration. The parallel frequency search algorithm realizes parallel search of frequencies by Fourier transform based on the linear search algorithm. The parallel code phase search algorithm realizes parallel search of code phase by using the characteristics of fast Fourier transform (FFT).

However, the above algorithms are all limited by the bit reversal of the navigation message, which leads to the coherent integration time in the design process of the acquisition algorithm cannot be too long. In addition, the increase of the number of non-coherent integration can improve the signal-to-noise ratio to a certain extent, and the acquisition sensitivity is improved. But, the squared loss in the non-coherent integration leads to a theoretical limit of improving the acquisition sensitivity through increasing the number of non-coherent integrations.

The existing satellite systems such as the Beidou Geostationary Satellite (GEO) and the Satellite-Based Augmentation System Satellite (SBAS) use a 500 bps navigation message rate, which results in a short coherent integration time and low acquisition sensitivity. This problem has become a bottleneck of receiver sensitivity performance.

Therefore, it is highly desirable to provide signal acquisition methods or devices with improved signal acquisition sensitivity to improve shortcomings in the prior art.

Figure 1:
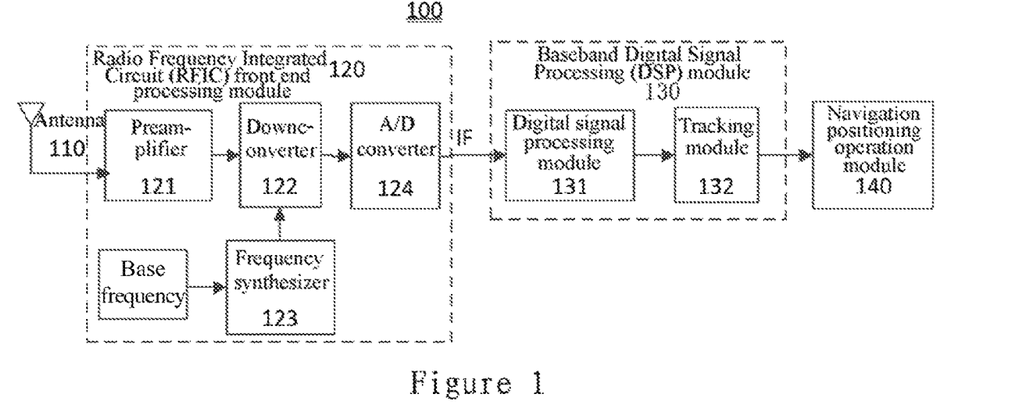
FIG. 1 is a schematic structural diagram showing a satellite signal receiver according to an embodiment of the present application.

FIG. 1 is a block diagram of a receiver of a conventional satellite signal.

As shown in FIG. 1, the receiver 100 is divided into, according to their functions, an antenna 110, a Radio Frequency Integrated Circuit (RFIC) front-end processing module 120, a baseband Digital Signal Processing (DSP) module 130, and a navigation positioning operation module 140.

As further shown in FIG. 1, in some embodiments, a Radio Frequency Integrated Circuit (RFIC) front-end processing module 120 may include a pre-amplifier 121, a downconverter 122, a frequency synthesizer (local oscillator) 123, and an A/D converter 124.

The RFIC front-end processing module 120 receives a satellite signal via the antenna 110, the signal is then amplified by the pre-amplifier 121 and processed through filtering process, etc., and the signal is then mixed with the sine wave local oscillator signal generated by the frequency synthesizer 123 through the downconverter 122, thereby downconverting to an intermediate frequency (IF) signal. Finally, the intermediate frequency signal is converted to a digital intermediate frequency signal through the A/D converter 124.

The baseband Digital Signal Processing (DSP) module 130 includes a digital signal processing module 131 and a tracking module 132. The baseband digital signal processing module 130, through processing the digital intermediate frequency signal IF (intermediate frequency data) output by the RF front-end processing module 120, copies the local carrier frequency and the local pseudo code signal that are consistent with the received satellite signal, thereby acquiring and tracking satellite signals through the digital signal processing module 131 and the tracking module 132, and obtaining measurements such as satellite pseudorange and carrier frequency phase and demodulating navigation message.

The navigation and positioning operation module 140 is used to receive the measured value of the satellite signal and the navigation message, and finally to determine the position of the receiver through operation.

Figure 2:
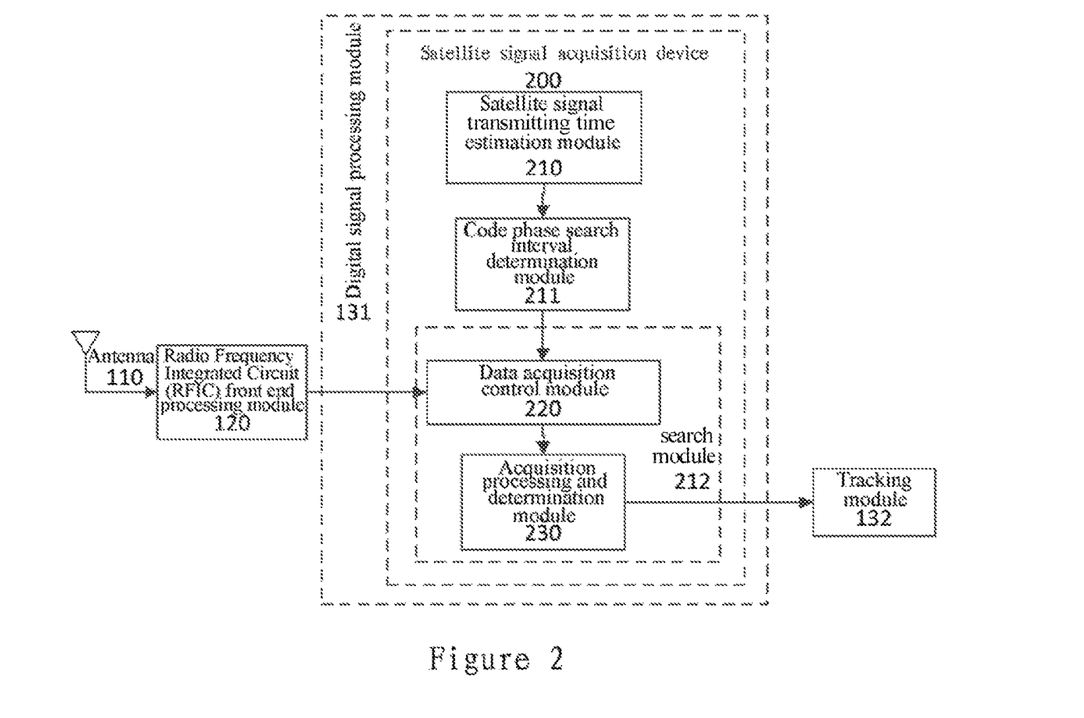
FIG. 2 is a schematic structural diagram showing a signal acquisition device according to an embodiment of the present application.

FIG. 2 is a block diagram showing the structure of a signal acquisition device according to an embodiment of the present application.

As shown in FIG. 2, the digital signal processing module 131 includes a satellite signal acquisition device 200. The satellite signal acquisition device 200 can be coupled between the Radio Frequency Integrated Circuit (RFIC) front-end processing module 120 and the tracking module 132, and the satellite signal acquisition device 200 may include a satellite signal transmitting time estimation module 210, a code phase search interval determination module 211, and a search module 212. The search module 212 comprises a data acquisition control module 220 and an acquisition processing and determination module 230.

The satellite signal transmitting time estimation module 210 is used to estimate the satellite signal transmitting time based on the estimation of the local time of the receiver and the estimation of the satellite signal travel time, to obtain an estimated value of the satellite signal transmitting time and an error range.

The code phase search interval determining module 211, based on the estimated value of the satellite signal transmitting time, its error range and the navigation message structure, estimates the frame header start time tt_sf_x and its error range ±tt_err, thereby determining tt_sf_x−tt_err to tt_sf_x+tt_erras the code phase search interval. The code phase search interval is divided into K code phase search subintervals $m_k$, wherein, x represents a sub-frame number and is an integer greater than 0, K is an integer greater than or equal to 1, and k represents a sequence number of the code phase search subinterval, its values are 1, 2, ..., K. The time length of the code phase search subinterval $m_k$ is $tm_k$ milliseconds, and the sum of the time lengths of K code phase search subintervals is greater than or equal to the double of the value of the error range tt_err.

The data acquisition control module 220 is used to control the data acquisition time of the intermediate frequency data and the acquisition time of the PN (Pseudo Noise) code data, to schedule the start and end times of the two, and to acquire the corresponding intermediate frequency data and the PN code for the subsequent acquisition determination operation. The specific configuration of the data acquisition control module 220 will be further described below with further reference to FIG. 4.

The acquisition processing and determination module 230 is used to perform acquisition processing on the obtained intermediate frequency data and PN code, and to further determine whether the satellite signal is acquired. The configuration structure and operational flow of the acquisition processing and determination module 230 will be further described below with reference to FIG. 6a-6b to FIG. 8b.

Figure 3:
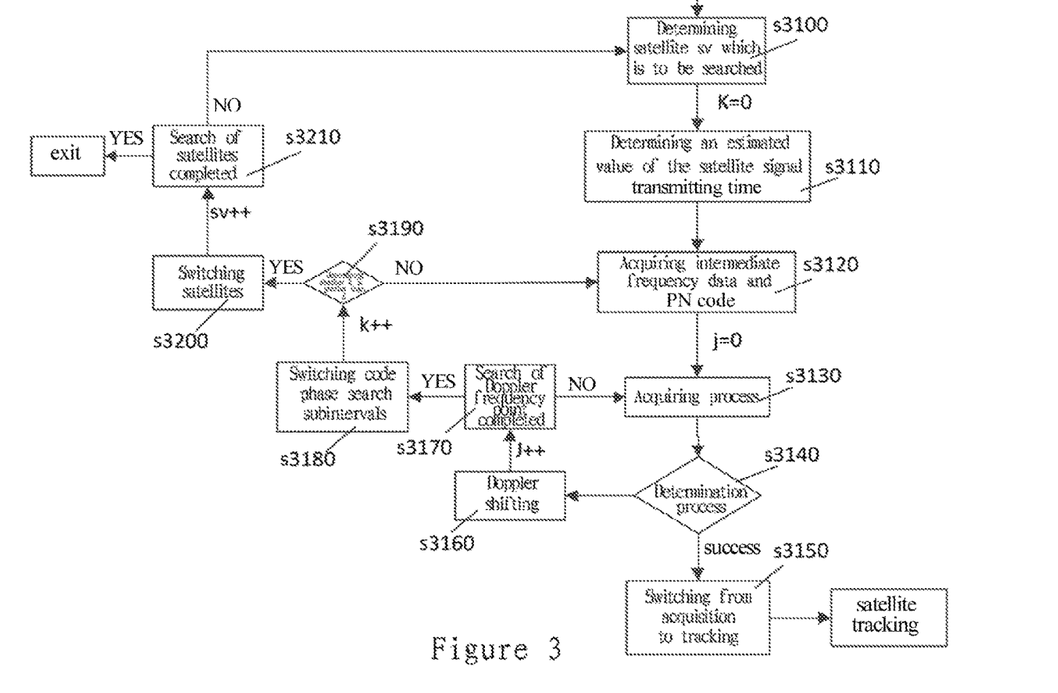
FIG. 3 is a flowchart showing a method of acquiring a satellite signal according to an embodiment of the present application.

FIG. 3 is a flow chart of a high sensitivity acquisition method in accordance with an embodiment of the present invention.

The overall implementation steps of the high sensitivity satellite signal acquisition method according to the present invention will be described first with reference to FIG. 3, and the specific mode of operation for each step and the structure or module for implementation will be further described in detail below with reference to FIG. 4-8b.

With reference to FIG. 3, at step S3100, the receiver initiates an acquisition process. The receiver, through the antenna, starts receiving the satellite signal from the satellite sv which is to be searched. The implementation of the present invention is specifically described below by using the initially determined No. 1 satellite to be searched, satellite sv1.

At step S3110, the satellite signal transmitting time estimation module 210 of the satellite signal acquisition device 200 determines an estimated value of the satellite signal transmitting time and its error range, and further based on the estimated value of the satellite signal transmitting time and its error range and navigation message structure, determining a frame header start time of each sub-frame of the navigation message and its error range ±tt_err. In addition, the code phase search interval determining module 211 determines the code phase search interval and the code phase search subinterval according to the frame header start time of the sub-frame and the error range thereof.

At step S3120, the search module 212 searches one code phase search subinterval $m_k$ in the code phase search interval, acquires intermediate frequency data starting from the determined data acquisition time, the final length of the acquired intermediate frequency data is $tm_k+tn$ milliseconds; and acquiring PN code corresponding to the frame header start time tt_sf_x, and the final length of the acquired PN code is tn milliseconds.

At step S3130, for a certain Doppler frequency point j, an acquisition process is performed according to the acquired intermediate frequency data and PN code to determine whether the acquisition is successful, wherein the acquisition process includes correlation operation processing, navigation message peeling processing, and fast Fourier transform (FFT) processing.

At step S3140, the result of the acquisition process is compared with a preset threshold to determine whether the acquisition was successful. If the result of the acquisition process is greater than the threshold, the acquisition is successful; the flow proceeds to step S3150, where the receiver performs an acquisition-to-track transition to achieve successful tracking of the satellite. If the result of the acquisition process is less than the threshold, the flow proceeds to step S3160 to perform Doppler shifting, thereby performing a search operation for the next Doppler frequency j+1.

Next, at step S3170, determining whether the searched Doppler frequency point is completed, that is, whether j+1 exceeds the maximum value of the number of Doppler frequency points. Only if it does not exceed, search the code phase search subinterval $m_k$ of the next Doppler frequency point j+1, and repeat steps S3130-S3140; if all Doppler frequency points are searched (j+1 exceeds the maximum number of Doppler frequency points), then, the flow proceeds to step S3180, at which time it searches the next code phase search subinterval $m_{k+1}$, and at step S3190, determining whether k is greater than K (where k can also indicate that several search operations have been performed, K represents the total number of code phase search subintervals or the total number of times of searches), if the number of times of searches k is less than or equal to K, then repeat the above steps S3120-S3170.

Further, when k>K, it indicates that the search of all the code phase search intervals of the satellite has been completed, thus the flow proceeds to step S3200 to exit the search of the satellite signal of the current satellite sv1, and search the code phase search interval of the next satellite sv2 in the same way as the satellite sv1. It should be noted that the same way means that the steps and processing methods needed are the same, but the length of the code phase search subinterval may be different. And at step S3170, determining whether the search of all satellites is completed, if the search of all satellite signals is completed or the acquisition of the satellite has been completed, then exit the current acquisition process.

Some of the steps of the above described acquisition method of embodiments of the present invention will be described in more detail below.

In some embodiments, the specific operation process at step S3110 can be performed as follows:

First, the satellite signal transmitting time estimation module 210 acquires the receiver time and estimates the error of the receiver time to generate an estimated value of the receiver time $\widehat{RT}_{(t)}$, calculates the estimated value of the satellite signal travel $$\frac{\hat{r}^i}{c},$$

wherein, the satellite transmission distance $\hat{r}$ can be estimated from the average distance of the satellite transmission distance, and an estimated value of the satellite signal travel time $\hat{tt}^i_{(t)}$ is determined according to Equation 1 below.

$$\hat{tt}^i_{(t)} = \widehat{RT}_{(t)} - \frac{\hat{r}^i}{c} \quad \text{(Equation 1)}$$

In some embodiments, the acquisition of the above receiver time and the estimation of the satellite signal travel time can be performed in a way known in the prior art and will not be described herein.

Secondly, after obtaining the estimated value of the satellite signal travel time $\hat{tt}^i_{(t)}$, the estimated value of the satellite signal transmitting time and its error range can be determined according to the estimated value of the local time of the receiver and the estimated value of the satellite signal travel time. The frame header start time tt_sf_x and its error range ±tt_err of each sub-frame of the navigation message can be estimated according to the estimated value of the satellite signal travel time, the error range of the estimated value, and the navigation message structure. The error range ±tt_err is explained as follows:

Due to the errors in the local time of the receiver and the satellite signal travel time during the estimation process, there will be errors in the satellite signal transmitting time obtained, and will further cause certain errors in the estimated frame header start time tt_sf_x. For example, the error of the estimated value of the receiver time $\widehat{RT}_{(t)}$ mainly comes from the different local time acquisition methods, and the error of the estimated value of the satellite signal travel time $$\frac{\hat{\rho}^i}{c}$$

mainly comes from the difference in information accuracy such as the receiver's position, and the two errors above will lead to certain errors in the estimated frame header start time tt_sf_x. In some embodiments, the estimated error range of the frame header start time tt_sf_x may be assumed as ±tt_err.

Further, based on the frame header start time tt_sf_x and its error range, tt_sf_x−tt_err to tt_sf_x+tt_err are determined as the code phase search interval of the satellite signal, dividing the code phase search interval into K code phase search subintervals $m_k$ (k=1 . . . K), and the search operation can be performed separately for each code phase search subinterval. Here, it is defined that the above x represents a sub-frame number and is an integer greater than 0. It should be noted here that the sub-frame number here is not a fixed sub-frame number in the navigation message format (for example, each frame of the GPS satellite navigation message includes numbers corresponding to 5 sub-frames), but the sequence number of the searched sub-frame viewed from the time axis. For example, if a satellite signal is acquired by a search in the third sub-frame of the second frame, the sub-frame number x is correspondingly numbered as 8 (5+3). In addition, it is assumed here that K is an integer greater than 1, and k represents the sequence number of the code phase search subinterval, k can also be understood as the times of searches or the number of times of searches. For example, each time a search is completed, the k is incremented by 1, that is, the values of k are 1, 2, . . . , K. In addition, it is assumed that the time length of the code phase search subinterval $m_k$ is $tm_k$ milliseconds, and the sum of the time lengths of K code phase search subintervals is greater than or equal to the double of the value of the error range tt_err.

Figure 4:
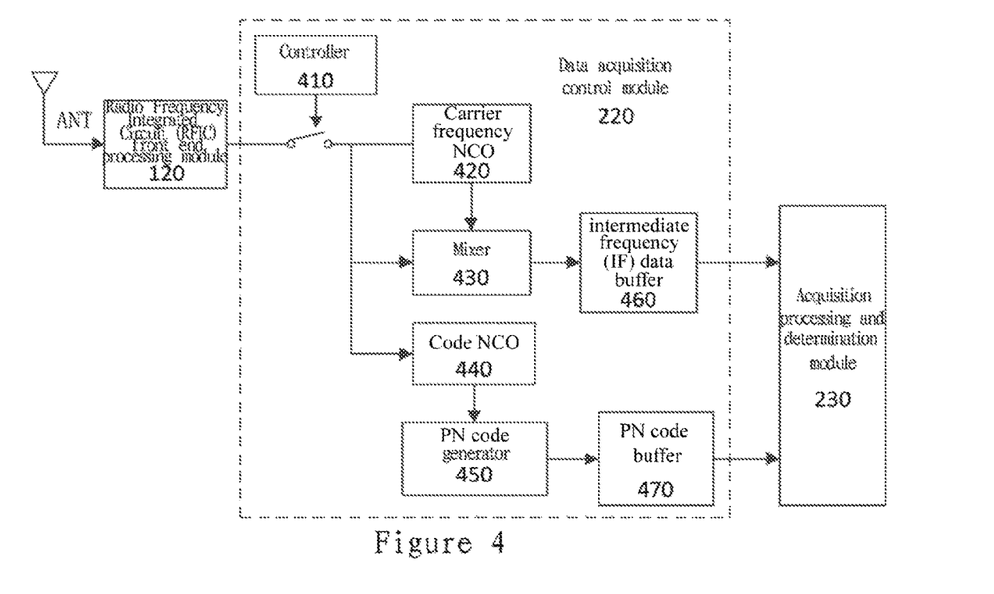
FIG. 4 is a schematic structural diagram showing a data acquisition control module according to an embodiment of the present application.

FIG. 4 is a block diagram showing the structure of the data acquisition control module 220 according to an embodiment of the present application.

The data acquisition control module 220 includes a controller 410 coupled in a way as shown in FIG. 4, a carrier digital oscillator (carrier frequency NCO) 420, a mixer 430, a code digital oscillator (code NCO) 440, a PN codegenerator 450, intermediate frequency (IF) data buffer 460 and PN code buffer 470.

The controller 410 is used to control the data acquisition time of the intermediate frequency data, the acquisition time of the PN code, and the time control and scheduling between the two.

A carrier digital oscillator (carrier frequency NCO) 420 and mixer 430 are used to further process the received signals for buffering in an intermediate frequency (IF) data buffer 460.

A code digital oscillator (code NCO) 440 and a PN code generator 450 are used to further process the PN code for buffering in the PN code buffer 470.

Based on the above realization of the satellite signal transmitting time estimation, the data acquisition control module 220 needs to acquire the corresponding intermediate frequency data and the PN code for subsequent acquisition processing and determination operation. Therefore, the controller 410 starts to buffer the intermediate frequency data at the selected data acquisition time, but in order to reduce the amount of buffered data, after the carrier frequency is eliminated from the intermediate frequency data by the mixer 430, the data is subjected to the low-pass filter and extraction. The final length of the intermediate frequency data is $tm_k$+tn milliseconds; in addition, the controller 410 also controls to extract or acquire corresponding PN code. The final length of the acquired PN code is tn milliseconds.

Figure 5A:
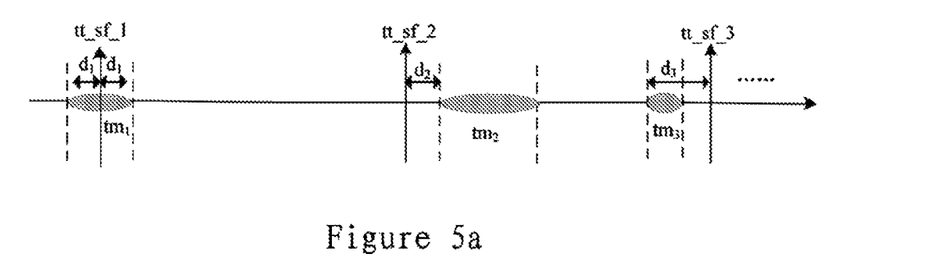
FIG. 5a is a schematic diagram showing control of data acquisition according to an embodiment of the present application.

FIG. 5 is a schematic diagram showing control data acquisition according to an embodiment of the present application;

Below with reference to FIG. 4 and FIG. 5a-5b, the starting step of searching any one of the code phase search subintervals $m_k$ will be specifically described.

As described above, the entire code phase search interval of length 2*tt_err has been divided into K code phase search subintervals, and the code phase search subinterval $m_k$ has a time length of $tm_k$ milliseconds, but in some embodiments, searching the code phase search subinterval $m_k$ requires to first determine the data acquisition time of the intermediate frequency data. Here, the estimated frame header start time tt_sf_x plus the corresponding time offset $d_k$ can be used as the data acquisition time, that is, the acquisition of the intermediate frequency data starts from the data acquisition time tt_sf_x+$d_k$ (it can be understood as, starting from this time point, controller 410 controls the switch to close and starts receiving data). The obtained intermediate frequency data is used for subsequent acquisition processing, the obtained intermediate frequency data has a final length of $tm_k$+tn milliseconds. As shown in FIGS. 5a-5b, the value of the time offset $d_k$ does not exceed the error range tt_err.

The process of controlling data acquisition to achieve a search of all +/−tt_err code phase search intervals of satellite signals is illustrated in FIGS. 5a-5c and 7a. For example, with reference to FIG. 5a, the data acquisition time corresponding to the code phase search subinterval $m_1$ may be tt_sf_1+$d_1$ (for example, $d_1$=−1/2$tm_1$), the controller 410 closes the switch at this time, the intermediate frequency data of $tm_1$+tn milliseconds can be obtained starting from the data acquisition time tt_sf_1+$d_1$; the data acquisition time corresponding to the code phase search subinterval $m_2$ may be tt_sf_2+$d_2$ (for example, $d_2$=1/2$tm_1$), the controller 410 can acquire the intermediate frequency data of $tm_2$+tn milliseconds starting from the data acquisition time tt_sf_2+$d_2$; the data acquisition time corresponding to the code phase search subinterval $m_3$ may be tt_sf_3+$d_3$ (for example, $d_3$=−1/2$tm_1$−$tm_3$), the controller 410 acquires the intermediate frequency data of $tm_3$+tn starting from this time; by analogy, those skilled in the art can conclude that $d_1$=−$d_2$, and for code phase search subintervals that starts from the third code phase search subinterval, when the code phase search subinterval number k is an odd number: the value of time offset $d_k$ satisfies $d_k$=$d_{k-2}$−$tm_{k2}$, and when the code phase search subinterval number k is an even number, the value of time offset $d_k$ satisfies $d_k=d_{k-2}+tm_{k-2}$.

Figure 7:
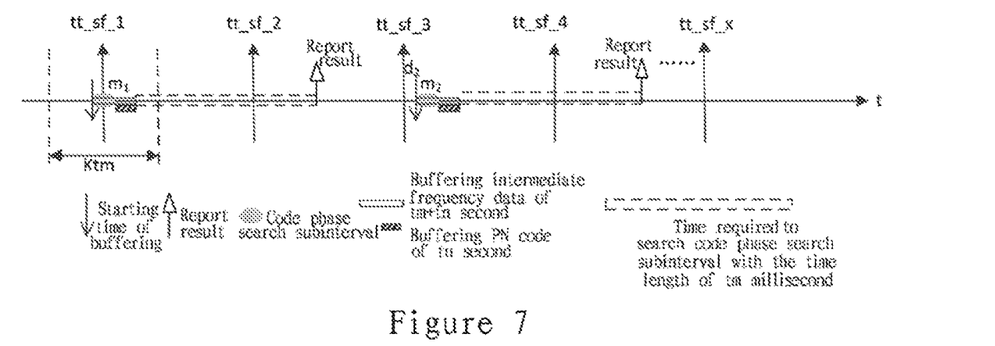
FIG. 7 is a schematic diagram showing control of data acquisition and delay acquisition processing and determination according to an embodiment of the present application.

Based on the offset and the estimated start time of the frame header, obtaining intermediate frequency data and PN code, until the time lengths $tm_1+tm_2+ \ldots tm_K$ of the K code phase search subintervals cover the entire code phase search interval, at this time, the search of the code phase search interval is completed. It should be noted that the sequence numbers of the sub-frames in FIG. 5a (for example, tt_sf_1, tt_sf_2, tt_sf_3, etc.) are only illustrative, as will be described in detail later with reference to FIG. 7a, here, it does not mean that that data acquisition is always performed at the beginning of each frame header.

According to the actual processing capability of the hardware and the software design, the values of the time length $tm_k$ (k=1, 2, . . . K) of each code phase search subinterval can be equal, not exactly equal or completely unequal, and each offset $d_k$ (k=1, 2, . . . K) in the data acquisition time may be equal, not exactly equal, or completely unequal. For example, FIG. 5a illustrates the respective time lengths $tm_1 \neq tm_2 \neq tm_3$ of the code phase search subintervals $m_1$, $m_2$, and $m_3$, as long as the sum of the time lengths of the code phase search subintervals can cover the entire code phase search interval. For convenience of description, the following will be specifically described based on an embodiment in which the time length $tm_k$ of each code phase search subinterval is equal. However, as will be understood by those who are skilled in the art, the present invention is not limited to this.

Figure 5B:
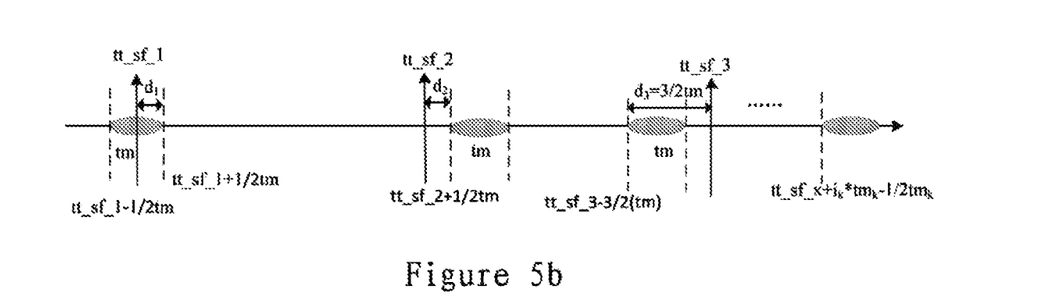
FIG. 5b is a schematic diagram showing control of data acquisition according to another embodiment of the present application.

In some embodiments, with reference to FIG. 5b, the time length $tm_k$ of each of the K code phase search subintervals is equal to tm milliseconds. In this case, the offset $d_k$ may be, for example, $i_k*tm_k-tm_k/2$, where the values of $i_k$ are sequentially taken in the sequence of 0, 1, −1, 2, −2, that is, in the first search, $i_k=0$; the second search, $i_k=1$; the third search, $i_k=-1$ The fourth search $i_k=2$; the fifth search $i_k=-2$, and so on. In this case, for the code phase search subinterval $m_1$, the controller 410 can acquire intermediate frequency data of tm+tn milliseconds starting from the data acquisition time tt_sf_1−tm/2; for the code phase search subinterval $m_2$, the controller may, for example, acquire the intermediate frequency data of tm+tn milliseconds starting from the data acquisition time tt_sf_2+tm/2; for the code phase search subinterval $m_3$, the controller 410 can, for example, start acquiring intermediate frequency data of tm+tn milliseconds starting from the data acquisition time tt_sf_3−3/2*tm; by analogy, for the code phase search subinterval $m_k$, the controller can start, for example, from the data acquisition time tt_sf_x+ik*tm−tm/2 ($i_k$=0, 1, −1, 2, −2, . . . ) to acquire intermediate frequency data of tm+tn milliseconds. And further as can be seen from FIG. 5b, the above code phase search subinterval is formed in a way that swings left and right with the corresponding sub-frame as a central axis, until the time length of all code phase search subintervals covers the entire code phase search interval K*tm. The acquired intermediate frequency data is stored in an intermediate frequency (IF) data buffer 460 for subsequent acquisition processing operations. It should also be noted that the above offset $d_k$ may also be selected in other ways, and is not necessarily limited to the above specific implementation.

Figure 5C:
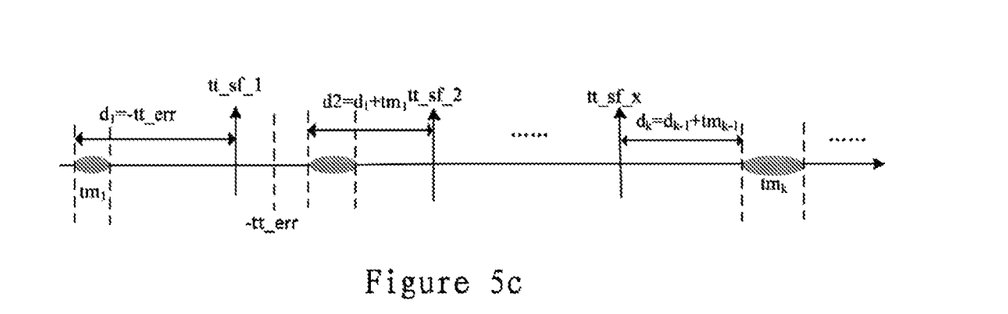
FIG. 5c is a schematic diagram showing control of data acquisition according to another embodiment of the present application.

With reference to FIG. 5c and in combination with FIG. 5a and FIG. 5b, those who are skilled in the art can also understand that as an alternative to the above-mentioned left and right swing mode, it is also possible to keep the search proceeding forward on the time axis, for example, the offset $d_k$ can be, for example, $d_k=d_{k-1}+tm_{k-1}$, where $d_1$=−tt_err and k is an integer sequence and k>1. As shown in FIG. 5c, for the code phase search subinterval $m_1$, the controller 410 can, for example, acquire the intermediate frequency data of tm+tn milliseconds starting from the data acquisition time tt_sf_1−tt_err ($d_1$=−tt_err); and for code phase search subinterval $m_2$, the controller 410 can, for example, acquire intermediate frequency data of tm+tn milliseconds starting from the data acquisition time tt_sf_2−tt_err+tm_1 ($d_2$=$d_1$+ $tm_1$=−tt_err+$tm_1$); for the code phase search subinterval $m_3$, the controller 410 can, for example, acquire intermediate frequency data of tm+tn milliseconds starting from the data acquisition time tt_sf_2−tt_err+tm_1+tm_2 ($d_3$=$d_2$+$tm_2$=− tt_err+$tm_1$+$tm_2$), and so on, until the time length of all K code phase search subintervals covers the entire code phase search interval, which will not be described further here. The same reason, for the case where the time lengths $tm_k$ of the code phase search subintervals are equal or unequal, the aforementioned forward search mode can also be adopted.

On the other hand, the controller 410 can control to acquire tn milliseconds of the corresponding PN code starting from the frame head time tt_sf_x, and the value of the tn does not exceed the length of the first two words in each sub-frame of the satellite navigation message. For example, for a typical 500 bps satellite signal, the sub-frame period is 600 ms, and the length of the first two words in each sub-frame is 120 ms, thus the time length tn of the acquired PN code only needs to be less than or equal to 120 ms.

In addition, for the time of acquiring the PN code, the controller 410 is able to select according to the need, for example, the PN code of the corresponding tn milliseconds can be acquired starting from the beginning of the data acquisition time of the intermediate frequency data, it is also possible to obtain the corresponding PN code of tn milliseconds before the end of the acquisition of the intermediate frequency data, or, the corresponding PN code may be generated after the acquisition of the intermediate frequency data ends.

In some embodiments, the PN code described above is a P code or a C/A code. Depending on the different implementations, the ways to obtain PN code can also be different. For example, for a satellite signal whose code generation mode is unknown, the external PN code generator can be controlled to generate PN code corresponding to the frame header start time tt_sf_x and to buffer in the PN code buffer 470. In other embodiments, for example, in the case where the code generation mode is known, the PN code may also be generated in real time after the end of the intermediate frequency data acquisition, such as generating the PN code in real time in subsequent processing operations by means of local generation, no acquisition of PN code is required.

Figure 6A:
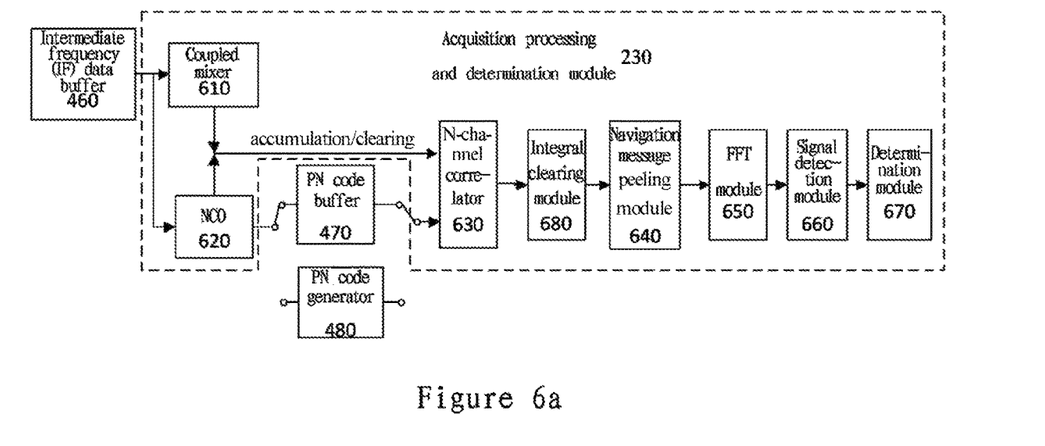
FIG. 6a is a schematic structural diagram showing an acquisition processing and determination module according to an embodiment of the present application.
Figure 6B:
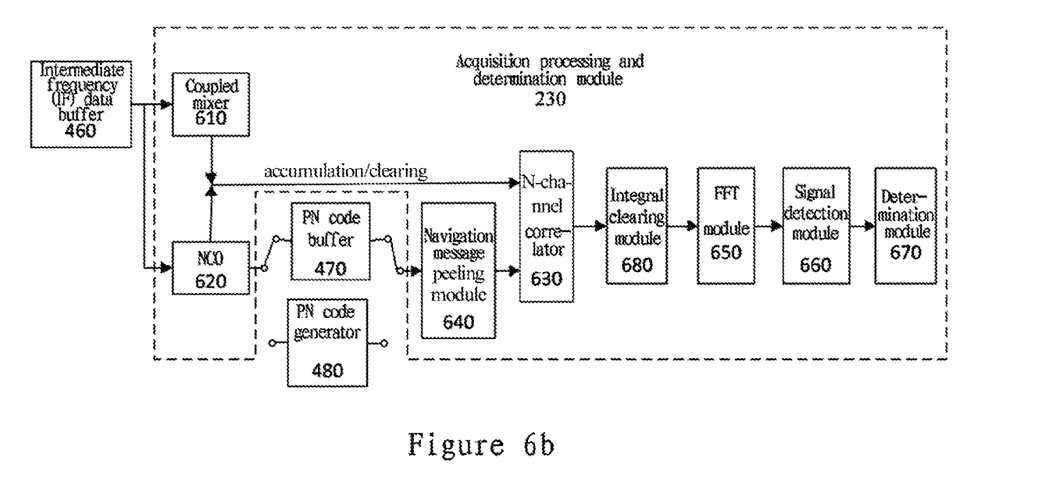
FIG. 6b is a schematic structural diagram showing an acquisition processing and determination module according to another embodiment of the present application.

FIGS. 6a and 6b are schematic diagrams showing the structure of an acquisition processing and determination module 230 according to various embodiments of the present application.

The acquisition processing and determination module 230 includes, as shown in FIGS. 6a and 6b, a coupled mixer 610, an NCO 620, an N-channel correlator 630, a navigation message peeling module 640, and a fast Fourier transform (FFT) module 650, a signal detection module 660, a determination module 670, and an integral clearing module 680. For situations in which the code generation mode is known, the acquisition processing and determination module 230 also includes a PN code generator 480.

Using the acquisition processing and determination module 230 shown in FIG. 6a as an example, the mixer 610 and the NCO 620 are used to perform further frequency conversion on the intermediate frequency data stored in the intermediate frequency data buffer 460 and the PN code in the PN code buffer 470, and perform accumulation/clearing operation before the intermediate frequency data is input to the N correlator. In addition, depending on the ways the PN code is acquired, it is possible to construct the PN code buffer 470 and the PN code generator 480 simultaneously, and switch the switch structures of the two, and choose the way to obtain the PN code according to specific requirements, the acquisition method and timing of the PN code are as described above, and will not be described further.

The parallel N-channel correlator 630 is used to correlate the intermediate frequency data with the local PN code to achieve different code phase searches, that is, each correlator, according to the input intermediate frequency data and the PN code, implements integration operation of tn milliseconds of different code phases, and output the integration result generated.

The integral clearing module 680 performs an integral clearing operation on the operation result of the N-channel correlator, and inputs the operation result to the navigation message peeling module 640.

The navigation message peeling module 640 performs a navigation message peeling operation on the operation result from the above-described integral clearing module. The peeling operation is briefly described as follows: the correlator implements 1 ms correlation processing of the GNSS signal, the N-channel correlator 630 outputs corresponding n sets of correlation results: $(I_0,Q_0)$; $(I_1,Q_1)$; $(I_2,Q_2)$; . . . $(I_{n-1},Q_{n-1})$, taking the GPS L C/A signal as an example, the navigation message transmission rate is 50 bps, and the navigation message data bit has the width of 20 ms. Performs the integral clearing operation on n sets of correlation results, then perform the navigation message peeling operation, the data after the navigation message peeling operation is: $(I_0,Q_0)*D_0$; . . . $(I_{19},Q_{19})*D_0$; $(I_{20},Q_{20})*D_1$; . . . $(I_{39},Q_{39})*D_1$; . . . , wherein, $D_0, D_1, D_2, \ldots D_n$ represent the navigation message data bits, and the values of $D_0, D_1, D_2, \ldots D_n$ are taken from 1 or $-1$, according to the frame header start time tt_sf_x and the structure of the navigation message corresponding to the time, the first two words of the navigation message can be predicted, and then, according to the contents of the first two words of the navigation message, it can be determined whether the navigation message is inverted, if the navigation message is inverted, then, the data bit has a value $-1$, if it is not inverted, the data bit has a value of 1.

Regardless of whether the PN code is acquired from the external PN code generator or the PN code is acquired by the acquisition processing and the determination module's own code generator, the signal transmitting time tt_sf_x corresponding to the generated PN code is known. And according to the satellite signal ICD file, the first two words of the start of the sub-frame include determined information such as a preamble, a sub-frame number, a SOW, or the like, or predictable information according to a time tt_sf_x corresponding to the sub-frame header (such as a sub-frame number, SOW, etc.). Therefore, the prediction of the first two words of the sub-frame can be implemented for any one of the sub-frames, thus, the result of the correlation operation is multiplied by 1 or $-1$ according to the positive or negative of the bits of the known navigation message (the navigation message of the first two words of the predicted sub-frame), to complete the navigation messages peeling operation. The result of the correlation operation after the navigation message peeling operation removes the influence of the navigation message on the correlation operation result.

In addition, FIG. 6 shows another implementation of the acquisition processing and determination module 230. The difference between this implementation and the implementation shown in FIG. 6a is that the navigation message peeling operation is performed before the correlation operation in FIG. 6b, but in FIG. 6a the navigation message peeling operation is performed after the correlation operation, the similar portion between FIG. 6a and FIG. 6b are omitted here, and will not be described further. In the case of FIG. 6b, the process of the navigation message peeling module 640 performing the navigation message peeling operation is briefly described as follows: the 1 msPN code output by the PN code buffer 470 or the PN code generator 480 is represented as $PN_0^0, PN_1^0 \ldots PN_{L-1}^0, PN_0^1, PN_1^1 \ldots PN_{L-1}^1 \ldots$. The data bits of the navigation message are represented as $D_0, D_1, D_2 \ldots D_n$. XOR the PN code and the data bits to complete the navigation message peeling operation, in this way, the PN code without the influence of the navigation message is input to the N-channel correlator 630 to further perform correlation operations with the intermediate frequency data, and the integral clearing operation is performed on the correlation operation result by the integral clearing module 680, and the result of the integral operation is input into the FFT module 650.

The FFT module 650 is used to perform an FFT calculation on the integration result of the navigation message peeling operation, and input the operation result to the signal detection module 660, then further, the determination module 670 compares the detection result with a preset threshold to perform an acquisition determination to complete the overall signal acquisition process.

FIG. 7 is a diagram showing control data acquisition and delay processing and determination according to an embodiment of the present application.

Since the satellite navigation signal acquisition process is a computationally-intensive processing unit, the acquisition hardware module tends to run at a higher frequency to increase the acquisition speed; at the same time, the technical solution of the present application utilizes the predictability and repeatability of the first two words in the navigation message information, to achieves the aforementioned satellite navigation message peeling operation. Therefore, data acquisition and delay processing are used to achieve data acquisition and delay high-speed processing so that data processing does not depend on the sampling rate, which can greatly improve the acquisition efficiency and shorten the acquisition time. The data acquisition and delay processing procedure will be described below with reference to FIG. 4 (the acquisition processing is performed in the case where the length of the intermediate frequency data is $tm_k$+tn milliseconds and the length of the PN code is tn milliseconds).

In addition, for convenience of description, in the following preferred embodiments, it is assumed that the time interval $tm_k$ for searching the subintervals based on each code phase is equal, the offset $d_k = i_k*tm_k - tm_k/2$, and the value of $i_k$ is sequentially taken from 0, 1, $-1$, 2, $-2$ . . . and the PN code is acquired in real time. However, as will be understood by those skilled in the art, the present invention is not limited thereto, and various implementations as described above may be employed.

As shown in FIG. 7 and FIG. 4, the time length of each code phase search subinterval is $tm_k$=tm, so the entire code phase search interval is K*tm, and the offset $d_k$ can be determined in the following manner: the value can be $i_k$*tm−tm/2, the value of $i_k$ is sequentially taken from the sequence of 0, 1, $-1$, 2, $-2$ . . . . For example, when searching for a certain Doppler frequency point j, for example, in the first code phase search subinterval $m_1$, the data acquisition time is determined according to the estimated frame header start time tt_sf_1 plus the corresponding time offset $d_1$, wherein the offset can be calculated according to the above Equation: $d_1=-tm/2$, that is, the controller 410 controls the device starting from the time tt_sf_1−tm/2 (The left starting point of the first ellipse shadow in FIG. 7 is the data acquisition time. In FIG. 7, the first downward arrow from the left indicates the time) to acquire intermediate frequency data with the length of tm+tn milliseconds (indicated by a rectangular frame in FIG. 7), and simultaneously acquiring PN code of tn milliseconds (indicated by a rectangular frame filled with slashes in FIG. 7). After the acquisition is completed, perform the acquisition processing including aforementioned correlation calculation, navigation message peeling operation and fast Fourier transform (FFT), the process is illustrated in the rectangular dashed box as shown in FIG. 7, and at the end, report the result of whether the satellite signal was successfully acquired (in FIG. 7, it is indicated by the first upward arrow from the left to the right). If the acquisition is successful, then start to switch the acquisition process to the tracking process, and the satellite is entered into the signal tracking status. But if the acquisition fails, then switch to the next Doppler frequency point j+1, and repeat the above-mentioned search process for the code phase search subinterval $m_1$ until the search of all the Doppler frequency points of the code phase search subinterval $m_1$ is completed.

If the search of all Doppler frequency points of the code phase search subinterval is completed without acquiring the satellite signal, then start acquiring data at the next data acquisition time (indicated by a second downward arrow from left to right in FIG. 7). As shown in FIG. 7, since the capabilities of the hardware processing are different, at the end of the processing time, the second sub-frame header start time adjacent to the first estimated sub-frame header start time may have already been missed, such as Tt_sf_2 shown in FIG. 7, therefore, the controller 410 will wait for the first sub-frame header start time that occurs after the processing result is reported (that is, the end of processing time), for example, may be tt_sf_3 as shown in FIG. 7, and add the corresponding offset to the first occurred sub-frame to be used as the next data acquisition time. For example, as shown in FIG. 7, the start time of the frame header of the first sub-frame appearing after the end of the search processing of the first code phase search subinterval $m_1$ is tt_sf_3, at this time, search the code phase search subinterval $m_2$, that corresponds to the sub-framett_sf_3, that is, the data acquisition time is determined according to the frame header start time tt_sf_3 plus the corresponding time offset $d_2$, at this time, $d_2=tm/2$, which means that the controller 410 closes the switch and starts to acquire intermediate frequency data from the time tt_sf_3+tm/2 (as shown in FIG. 7, the left starting point of the second elliptical shadow is the data acquisition time, the second right down arrow from the left to the right). In fact, in actual operation, the data acquisition time corresponding to each code phase search subinterval $m_k$ can be automatically determined according to the processing time directly obtained by the software performing the acquisition processing. Further, after the acquisition is completed, perform the acquisition processing as described above, and at the end, report the result of whether or not the satellite signal is successfully acquired (shown in FIG. 7 as indicated by the second upward left arrow from the left to the right). By analogy, the search of all other code phase search subintervals is implemented until the acquisition is successful or the search of all K code phase search subintervals $m_k$ has been completed. If the satellite signal is still not found, switch to the next satellite sv2 to search again. In addition, when a satellite successfully achieves tracking and synchronization, the estimation error of the subsequent satellite frame header start time will be reduced, thereby reducing the size of the subsequent satellite code phase search interval and accelerating the subsequent satellite search process until all satellite acquisitions are completed.

Figure 8A:
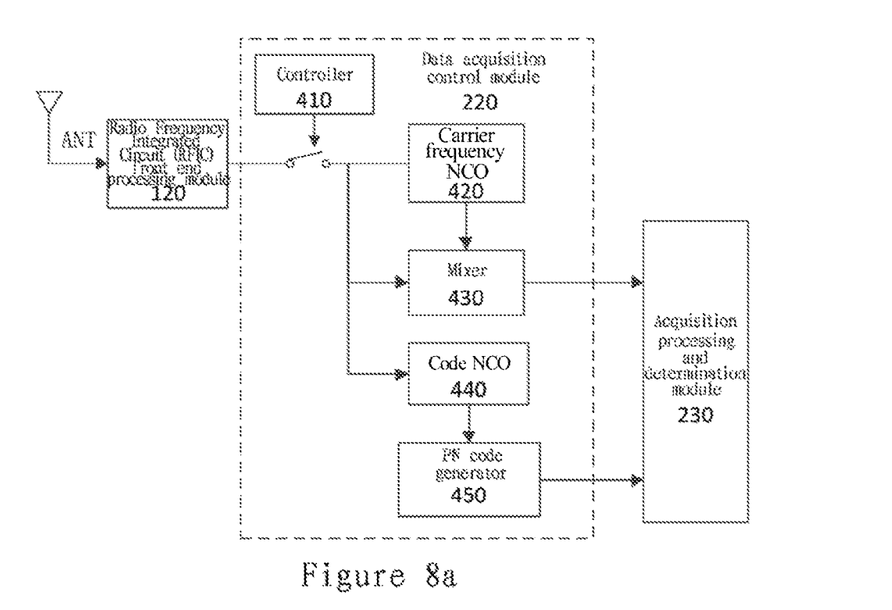
FIG. 8a is a schematic structural diagram showing another implementation of a data acquisition control module according to an embodiment of the present application.
Figure 8B:
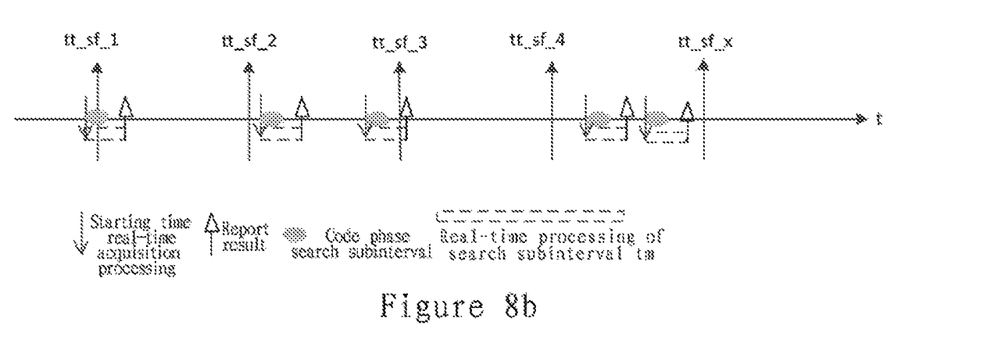
FIG. 8b is a schematic diagram showing implementation of control data acquisition and real-time acquisition processing and determination based on the data acquisition control module of FIG. 8a according to an embodiment of the present application.

As can be understood by those skilled in the art, the implementation of the present invention is not limited to the above data acquisition and implementation of delay processing and determination (for example, FIG. 7 above is based on that the final length of the acquired intermediate frequency data is tm+tn milliseconds and the final length of the PN code is tn milliseconds before the acquisition process), if the hardware has strong processing capability, the acquired two kinds of data can be processed in real time. With reference to FIG. 8a and FIG. 8b, the process of the real-time processing mode will be explained below according to an embodiment in which the control data is acquired and the acquisition processing starts in real time at the data acquisition time. This method is an alternative to the above data acquisition and delay processing.

FIG. 8a is a schematic structural diagram showing another implementation of a data acquisition control module 220 according to an embodiment of the present application.

The data acquisition control module 220 includes a controller 410 coupled in a way as shown in FIG. 8a, a carrier digital oscillator (carrier frequency NCO) 420, a mixer 430, a code digital oscillator (code NCO) 440, and a PN code generator 450. Compared to FIG. 4, the intermediate frequency (IF) data buffer 460 and the PN code buffer 470 are omitted. The components in FIG. 8a have the same functions as the components of the same reference numerals in FIG. 4, and therefore will not be described further here, the difference is that since there is no intermediate frequency data buffer 460 and PN code buffer 470, therefore, the acquisition processing and determination module 230 processes the acquired intermediate frequency data and the PN code in real time without first buffering.

The data acquisition and processing control process in FIG. 8b is similar to that shown in FIG. 7, and the same parts will not be described further, the only difference being that when acquiring the data (obviously, the length of the intermediate frequency data has not reached tm+tn milliseconds and the length of the PN code has not reached tn milliseconds), the intermediate frequency data and the PN code that have been acquired can be processed in real time to achieve acquisition. At this time, the N-channel correlator completes the search processing for the code phase search subinterval through real-time processing (as shown in the dashed box in FIG. 8b). And in the real-time processing, if the acquired amount of data exceeds the processing capability of the hardware, the excess amount of the intermediate frequency data and the PN code are discarded after the end of the acquisition processing to facilitate the subsequent acquisition of the data. As shown in FIG. 8b, for the first code phase search subinterval $m_1$, in the case where the intermediate frequency data and the PN code already exist, the acquisition and determination processing is performed (as shown in FIG. 8b, the start of the dotted line frame illustrating the acquisition process is aligned with the left side of the code phase search subinterval to indicate that the acquisition processing is started after the intermediate frequency data and the PN code are present). Compared with the data acquisition and delay processing methods, at the same acquisition speed, the real-time processing method requires more hardware resources to cover the search processing of the code phase search subinterval, therefore, relatively, a larger expense on hardware recourses is required; or, in the case of the same hardware resources, more times of K is required to cover all code phase search spaces FIG. 9 is an OEM board of a signal acquisition device according to an embodiment of the present application.

Figure 9:
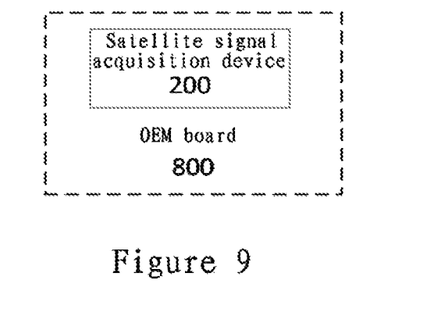
FIG. 9 is an OEM board of a signal acquisition device according to an embodiment of the present application.

As shown in FIG. 9, the OEM board 800 includes the signal acquisition device 200 in the above embodiment. The board device could be an OEM board.

Figure 10:
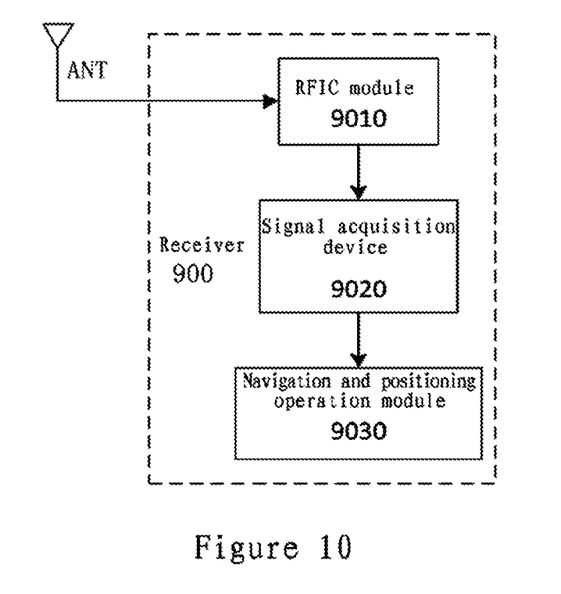
FIG. 10 is a receiver of a signal acquisition device according to an embodiment of the present application.

FIG. 10 is a receiver 900 of a signal acquisition device 200 according to an embodiment of the present application. As shown in FIG. 10, the receiver 900 includes an RFIC module 9010, a signal acquisition device 9020, and a navigation and positioning operation module 9030. Wherein, the RFIC 9010 and the navigation and positioning operation module 9030 are shown in the above-described FIG. 1, and the signal acquisition device 9020 can be implemented according to the above-described embodiments of the present invention.

Compared with the prior art, the application has the beneficial effects: when the receiver time is known, the estimated value of the satellite single transmitting time is estimated according to the estimated value of the receiver time and the estimated value of the satellite signal travel time, and determining an estimated frame header start time and an error range according to the estimated value of the transmitting time and the structure of the navigation message, determining a code phase search interval according to the error range, based on the estimated frame header start time and time offset, determining the data acquisition time to obtain the intermediate frequency data and the PN code, performing the acquisition processing and determination on the intermediate frequency data and the PN code. During the acquisition processing and determination, the navigation message peeling operation is performed using the predictability of the first two words of each sub-frame of the satellite navigation message, thereby, eliminating the influence of bit inversion of the satellite navigation message on coherent integration during the acquisition process, extending the time of coherent integration, and improves the acquisition sensitivity. In addition, the data acquisition and delay processing mode is adopted, which improves the utilization of data before and after the frame header time, achieves fast acquisition, at the same time, the introduction of the data acquisition and delay processing mode makes the data processing of the acquisition module independent of the sampling rate, improves acquisition efficiency and is suitable for the design of high-intense modules with other GNSS signal and communication systems.

Unless clearly required by the context, otherwise the words "including", "comprising", etc., used in the specification and claims are to be interpreted with an inclusive meaning rather than with an exclusive or exhaustive meaning, in other words, it means "including, but not limited to." The word "coupled," as used generally, refers to two or more elements that may be directly connected or connected through one or more intermediate elements. In addition, the words "herein," "above," "hereafter," and the like, when used in this application, are meant to refer to the entirety of the application and do not refer to any particular portion of the application. When the context permits, the singular or plural terms used in the above implementation may also include the plural or the singular. The word "or" refers to a list of two or more items that cover all of the following interpretations of a word: any item in the list, all items in the list, and any combination of items in the list.

The teachings of the present invention provided herein can be applied to other systems, and are not necessarily the systems described above. The elements and acts of the various embodiments described above can be combined to provide a further embodiment.

Although some embodiments of the invention have been described, these embodiments are presented by way of example only, and are not intended to limit the scope of the invention. Indeed, the novel methods and systems described herein may be embodied in a variety of other forms. Also, various forms, methods, and systems may be made without departing from the spirit of the invention. The appended claims and their equivalents are intended to cover such forms or modifications.

What is claimed is:

1. A method for acquiring satellite signals, comprising:
estimating a satellite signal transmitting time, comprising:
acquiring a receiver time, estimating an error of the receiver time to generate an estimated value of receiver time; obtaining an estimated value of the satellite signal travel time, and determining an estimated value and an error range of the satellite signal transmitting time according to the estimated value of the receiver time and the estimated value of the satellite signal travel time;

determining a code phase search interval, comprising:
based on the estimated value of the satellite signal transmitting time, the error range of the satellite signal transmitting time and navigation message structure, estimating a frame header start time tt_sf_x and its error range ±tt_err, thereby determining tt_sf_x−tt_err to tt_sf_x+tt_err as the code phase search interval, dividing the code phase search interval into K code phase search subintervals $m_k$, wherein, x represents a sub-frame number and is an integer greater than 0, K is an integer greater than or equal to 1, and k represents a sequence number of the code phase search subinterval, k is an integer, 1≤k≤K, the time length of the code phase search subinterval $m_k$ is $tm_k$ milliseconds, and the sum of the time lengths of K code phase search subintervals is greater than or equal to the double of the value of the error range tt_err;

performing search operations comprising data acquisition control operations, acquisition processing and determination operations;

wherein the data acquisition control operations comprise:
acquiring the intermediate frequency data starting from data acquisition time, the acquired intermediate frequency data has a final length of $tm_k$+tn milliseconds, and acquiring PN code corresponding to the frame header start time tt_sf_x, the acquired PN code has a final length of tn milliseconds, wherein the estimated frame header start time tt_sf_x plus the corresponding time offset $d_k$ can be used as the data acquisition time, and the value of tn does not exceed the length of the first two words in each sub-frame of the navigation message; and where the acquisition processing and determination operations comprise: for a certain Doppler frequency point, at any time during the period from the data acquisition time to the end of data acquisition, performing an acquisition processing operation on the acquired intermediate frequency data and PN code, and comparing the result of the acquisition processing with a preset threshold to perform a determination operation, wherein, the acquisition processing includes correlation operation processing, navigation message peeling processing, and fast Fourier transform processing.

2. The method of claim 1, wherein the search operations comprise:
when the result of the determination is that the acquisition fails, switching to the next Doppler frequency point, and after the switching frequency point is completed, performing the search operation on the code phase search subinterval $m_k$ of the next Doppler frequency point, until the acquisition is successful or the search of the code phase search subinterval of all Doppler frequencies is completed.

3. The method of claim 2, wherein, in the case that the search of code phase search subinterval for all Doppler frequency points is completed without successful acquisition, the method further comprises: according to the search operation searching the next code phase search subinterval $m_{k+i}$, wherein the frame header start time corresponding to the code phase search subinterval $m_{k+1}$ is the first frame header start time that appears after the completion of acquisition processing of the last code phase search subinterval $m_k$, and the data acquisition time of the code phase search subinterval $m_{k+1}$ is the first occurred frame header start time plus the corresponding time offset $d_{k+1}$.

4. The method of claim 1, wherein the value of the time offset $d_k$ does not exceed the error range tt_err.

5. The method of claim 1, wherein the value of time offset is determined through the following: the value of time offset $d_k$ satisfies: $d_1=-d_2$, for the code phase search subintervals starting from the third code phase search subinterval k=3, when the subinterval number k is an odd number: the value of time offset $d_k=d_{k-2}-tm_{k-2}$, and when the subinterval number k is an even number, the value of time offset $d_k=d_{k-2}+tm_{k-2}$; or
the value of time offset $d_k=i_k*tm_k-tm_k/2$, the values of k are 1, 2, . . . , K, the value of $i_k$ is sequentially taken from the sequence of 0, 1, −1, 2, −2 . . . , and each $tm_k$ is equal; or
the value of time offset, when k=1, satisfies $d_1=-tt\_err$, and when k is an integer greater than 1, satisfies: $d_k=d_{k-1}+tm_{k-1}$.

6. The method of claim 1, further comprising:
in the case of successful acquisition, calibrating the receiver time after completing the sub-frame synchronization and re-estimating the error of the receiver time, and performing acquisition of the next satellite; or
in the case that the search of K code phase search subinterval is completed without successful acquisition, performing acquisition of the next satellite.

7. The method of claim 1, wherein the satellite signal travel time is greater than or equal to the minimum travel time and less than or equal to the maximum travel time, and wherein estimating a satellite signal transmitting time comprising subtracting an estimated value of the satellite signal travel time from an estimated value of the receiver time.

8. The method of claim 1, wherein the PN code comprising: the PN code corresponding to frame header start time tt_sf_x acquired by controlling the external PN code generator; or PN code that is locally generated and corresponds to frame header start time tt_sf_x.

9. The method of claim 1, wherein the acquisition processing and determination operations comprise: first performing a navigation message peeling operation on the PN code, and performing correlation operation processing, integral clearing processing, and fast Fourier transform processing on the PN code and the intermediate frequency data; or first performing correlation operation processing on the PN code and the intermediate frequency data, and performing integral clearing on the result of the correlation operation processing, and then performing navigation message peeling operation on the output of integral clearing, and performing fast Fourier transform processing on the result of the peeling operation.

10. The method of claim 1, wherein the correlation operation processing comprises coherent integration of the intermediate frequency data and the PN code through multiple correlators, and wherein tn is the selected coherent integration time.

11. The method of claim 9, wherein the navigation message peeling operation comprises determining, according to the start time of the frame header of the code phase search subinterval, whether the navigation message bits corresponding to the frame is positive or negative, and according to the positive or negative of the navigation data bits, the PN code is multiplied by 1 or −1 to eliminate the influence of the navigation message on the result of the correlation operation.

12. The method of claim 1, wherein, at any time during the period from the data acquisition time to the end of data acquisition, performing the acquisition processing operation on the acquired intermediate frequency data and PN code, including performing the acquisition processing when the length of the intermediate frequency data is $tm_k+tn$ milliseconds and the length of the PN code is tn milliseconds, or performing real-time processing on the acquired intermediate frequency data and PN code.

13. A board device, comprising a signal acquisition device, the signal acquisition device comprising:
a satellite signal transmitting time estimation module, performing the operation of estimating a satellite signal transmitting time comprising: acquiring a receiver time, estimating an error of the receiver time to generate an estimated value of receiver time, obtaining an estimated value of the satellite signal travel time, and determining an estimated value and an error range of the satellite signal transmitting time according to the estimated value of the receiver time and the estimated value of the satellite signal travel time;
a code phase search interval determination module, performing the operation of determining a code phase search interval comprising: based on an estimated value of the satellite signal transmitting time, the error range of the satellite signal transmitting time and navigation message structure, estimating a frame header start time tt_sf_x and its error range ±tt_err, thereby determining tt_sf_x−tt_err to tt_sf_x+tt_erras the code phase search interval, dividing the code phase search interval into K code phase search subintervals $m_k$, wherein, x represents a sub-frame number and is an integer greater than 0, K is an integer greater than or equal to 1, and k represents a sequence number of the code phase search subinterval, k is an integer, 1≤k≤K, the time length of the code phase search subinterval $m_k$ is $tm_k$ milliseconds, and the sum of the time lengths of K code phase search subintervals is greater than or equal to the double of the value of the error range tt_err;
a search module, performing search operations, the search module comprising a data acquisition control module and an acquisition processing and determination module,
wherein, the data acquisition control module performing data acquisition control operations comprising: acquiring the intermediate frequency data starting from data acquisition time, the acquired intermediate frequency data has a final length of $tm_k+tn$ milliseconds, and acquiring PN code corresponding to the frame header start time tt_sf_x, the acquired PN code has a final length of tn milliseconds, wherein the estimated frame header start time tt_sf_x plus the corresponding time offset $d_k$ can be used as the data acquisition time, and the value of tn does not exceed the length of the first two words in each sub-frame of the navigation message; and the acquisition processing and determination module performing the acquisition processing and determination operations comprising: for a certain Doppler frequency point, at any time during the period from the data acquisition time to the end of data acquisition, performing an acquisition processing operation on the acquired intermediate frequency data and PN code, and comparing the result of the acquisition processing with a preset threshold to perform a determination operation, wherein, the acquisition processing includes correlation operation processing, navigation message peeling processing, and fast Fourier transform processing.

14. The board device of claim 13, wherein the search module also performs the following operation: when the result of the determination is that the acquisition fails, switching to the next Doppler frequency point, and after the switching frequency point is completed, performing the search operation on the code phase search subinterval $m_k$ of the next Doppler frequency point, until the acquisition is successful or the search of the code phase search subinterval $m_k$ of all Doppler frequencies is completed.

15. The board device of claim 14, wherein the search module also performs the following operation: in the case that the search of code phase search subinterval for all Doppler frequency points is completed without successful acquisition, the method further comprising: according to the search operation searching the next code phase search subinterval $m_{k+1}$, wherein the frame header start time corresponding to the code phase search subinterval $m_{k+1}$ is the first frame header start time that appears after the completion of acquisition processing of the last code phase search subinterval $m_k$, and the data acquisition time of the code phase search subinterval $m_{k+1}$ is the first occurred frame header start time plus the corresponding time offset $d_{k+1}$.

16. The board device of claim 13, wherein the acquisition processing and determination module also performs the following operation: calibrating the receiver time after completing the sub-frame synchronization and re-estimating the error of the receiver time, and performing acquisition of the next satellite; or in the case that the search of K code phase search subinterval is completed without successful acquisition, performing acquisition of the next satellite.

17. The board device of claim 13, wherein the value of time offset is determined through the following: the value of time offset $d_k$ satisfies: $d_1=-d_2$, for the code phase search subintervals starting from the third code phase search subinterval k=3, when the subinterval number k is an odd number: the value of time offset $d_k=d_{k-2}-tm_{k-2}$, and when the subinterval number k is an even number, the value of time offset $d_k=d_{k-2}+tm_{k-2}$; or the value of time offset $d_k=i_k*tm_k-tm_k/2$, the values of k are 1, 2, ..., K, the value of $i_k$ is sequentially taken from the sequence of 0, 1, -1, 2, -2 ..., and each $tm_k$ is equal; or the value of time offset, when k=1, satisfies: $d_1=-tt\_err$, and when k is an integer greater than 1, satisfies: $d_k=d_{k-1}+tm_{k-1}$.

18. The board device of claim 13, wherein the acquisition processing comprises first performing a navigation message peeling operation on the PN code, and performing correlation operation processing, integral clearing processing, and fast Fourier transform processing on the PN code and the intermediate frequency data; or first performing correlation operation processing on the PN code and the intermediate frequency data, and performing integral clearing on the result of the correlation operation processing, and then performing navigation message peeling operation on the output of integral clearing, and performing fast Fourier transform processing on the result of the peeling operation.

19. The board device of claim 13, wherein at any time during the period from the data acquisition time to the end of data acquisition, performing an acquisition processing operation on the acquired intermediate frequency data and PN code, including performing the acquisition processing when the length of the intermediate frequency data is $tm_k+tn$ milliseconds and the length of the PN code is to milliseconds, or performing real-time processing on the acquired intermediate frequency data and PN code.

20. A receiver, comprising a board device comprising a signal acquisition device, the signal acquisition device comprising:

a satellite signal transmitting time estimation module, performing the operation of estimating a satellite signal transmitting time comprising: acquiring a receiver time, estimating an error of the receiver time to generate an estimated value of receiver time, obtaining an estimated value of the satellite signal travel time, and determining an estimated value and an error range of the satellite signal transmitting time according to the estimated value of the receiver time and the estimated value of the satellite signal travel time;

a code phase search interval determination module, performing the operation of determining a code phase search interval comprising: based on an estimated value of the satellite signal transmitting time, the error range of the satellite signal transmitting time and navigation message structure, estimating a frame header start time tt_sf_x and its error range ±tt_err, thereby determining tt_sf_x−tt_err to tt_sf_x+tt_err as the code phase search interval, dividing the code phase search interval into K code phase search subintervals $m_k$, wherein, x represents a sub-frame number and is an integer greater than 0, K is an integer greater than or equal to 1, and k represents a sequence number of the code phase search subinterval, k is an integer, 1≤k≤K, the time length of the code phase search subinterval $m_k$ is $tm_k$ milliseconds, and the sum of the time lengths of K code phase search subintervals is greater than or equal to the double of the value of the error range tt_err; and a search module, performing search operations, the search module comprising a data acquisition control module and an acquisition processing and determination module, wherein the data acquisition control module performs data acquisition control operations comprising: acquiring the intermediate frequency data starting from data acquisition time, the acquired intermediate frequency data has a final length of $tm_k+tn$ milliseconds, and acquiring PN code corresponding to the frame header start time tt_sf_x, the acquired PN code has a final length of tn milliseconds, wherein the estimated frame header start time tt_sf_x plus the corresponding time offset $d_k$ can be used as the data acquisition time, and the value of tn does not exceed the length of the first two words in each sub-frame of the navigation message; and the acquisition processing and determination module performing the acquisition processing and determination operations: for a certain Doppler frequency point, at any time during the period from the data acquisition time to the end of data acquisition, performing an acquisition processing operation on the acquired intermediate frequency data and PN code, and comparing the result of the acquisition processing with a preset threshold to perform a determination operation, wherein, the acquisition processing includes correlation operation processing, navigation message peeling processing, and fast Fourier transform processing.

* * * * *